Figure 1:
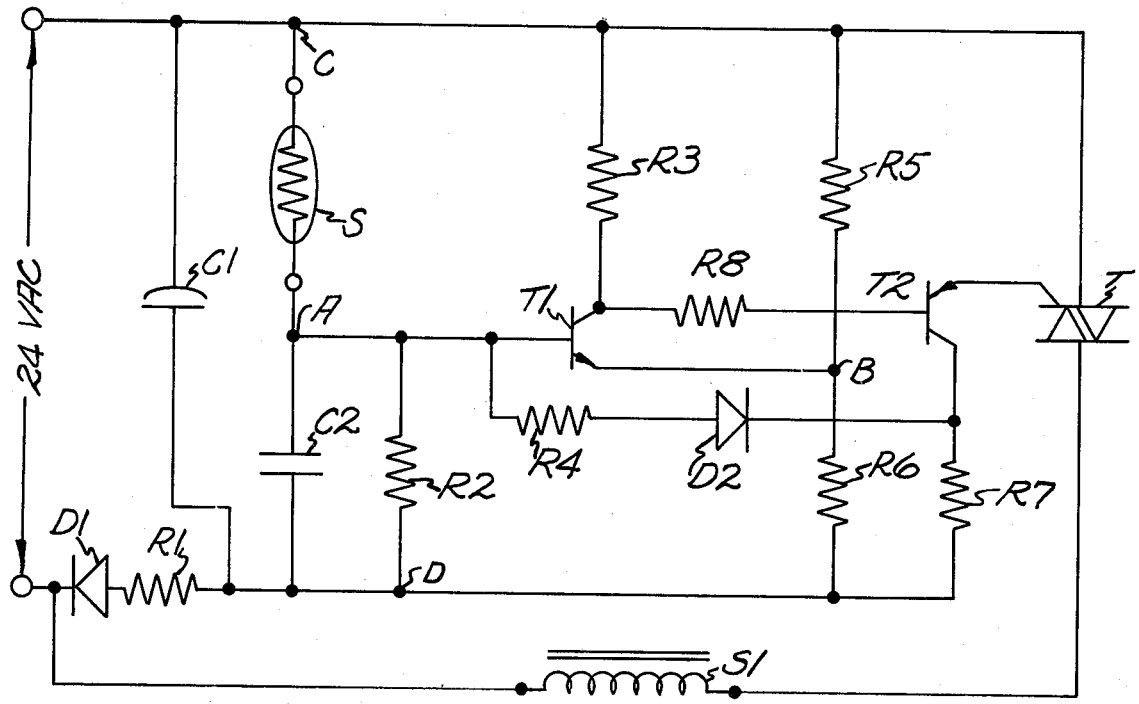

United States Patent

Hirsbrunner et al.

[11] 3,909,675
[45] Sept. 30, 1975

[54] PROTECTION CIRCUIT

[75] Inventors: Hans G. Hirsbrunner, Attleboro; Leo A. Plouffe, North Dighton; Lyle E. McBride, Jr., Norton, all of Mass.

[73] Assignee: Texas Instruments Incorporated, Dallas, Tex.

[22] Filed: Dec. 13, 1972

[21] Appl. No.: 314,883

[52] U.S. Cl. ............... 317/41; 317/13 B; 317/13 C; 219/499; 219/501
[51] Int. Cl.² ..................... H02H 5/04; H02H 7/085
[58] Field of Search ........... 219/499, 501, 483, 491, 219/494, 497; 317/42, 13 R, 13 C, 13 B; 307/310

[56] References Cited
UNITED STATES PATENTS

| | | | |
|---|---|---|---|
| 3,320,407 | 5/1967 | Holmes | 219/501 |
| 3,329,869 | 1/1967 | Obenhaus | 317/13 C |
| 3,366,843 | 1/1968 | Evalds | 317/42 |
| 3,404,313 | 10/1968 | Happel et al. | 317/13 C |
| 3,417,305 | 12/1968 | Russell | 317/42 |
| 3,457,460 | 7/1969 | Buiting et al. | 317/13 C |
| 3,500,074 | 3/1970 | Obenhaus | 307/310 |
| 3,546,435 | 12/1970 | Welch | 219/501 |
| 3,555,356 | 1/1971 | Kaiser | 317/13 C |
| 3,593,062 | 7/1971 | Quinn | 317/42 |
| 3,597,590 | 8/1971 | Fleming | 219/501 |
| 3,614,392 | 10/1971 | Apel | 219/501 |
| 3,740,613 | 6/1973 | Strachan | 317/13 C |
| 3,751,635 | 8/1973 | Niehaus | 219/499 |

*Primary Examiner*—J. D. Miller
*Assistant Examiner*—Patrick R. Salce
*Attorney, Agent, or Firm*—John A. Haug; James P. McAndrews; Russell E. Baumann

[57] ABSTRACT

The disclosure relates to a motor protection circuit utilizing PTC sensors and all solid state circuitry to provide protection to a motor circuit and the like. The protection circuit is capable of providing protection for a plurality of devices simultaneously. The sensor circuits can be connected either serially or in parallel and provide equivalent results.

8 Claims, 2 Drawing Figures

PROTECTION CIRCUIT

This invention relates to a protection circuit for use with motors and the like and more specifically to an all solid state protection circuit using a minimum of circuitry with high reliability.

Protection circuits have been known in the prior art including those utilizing PTC sensors. One such prior art protection circuit is set forth in the application of R. W. Strachan, Ser. No. 243,328, filed Apr. 12, 1972 which issued as U.S. Pat. No. 3,740,613 on June 19, 1973. While circuits of this type have been highly successful and provide good results, they have been relatively large in size and have required self heating of the sensors to provide proper temperature differentials, this requiring additional circuitry.

In accordance with the present invention, there is provided an all solid state protection circuit which does not require the additional circuit components to provide self heating of the PTC sensors. Briefly, this is accomplished because the voltage across the sensors increases when the protection circuit trips out and therefore the amount of self heating of the sensor is increased without the requirements of external self heating circuitry and components. Furthermore, the use of all solid state circuitry provides a relatively inexpensive and less bulky protective circuit.

It is therefore an object of this invention to provide an all solid state protective circuit using PTC sensors.

It is a further object of this invention to provide a protection circuit which does not require external components to provide self heating of the sensors.

It is yet a further object of this invention to provide a relatively lower cost and smaller size protection circuit.

It is a still further object of this invention to provide a protection circuit having a reset condition below the normal alarm condition.

It is a yet further object of this invention to provide a protection circuit having the triac gate connected in series with the emitter of one transistor of a modified Schmitt trigger circuit.

Figure 2:
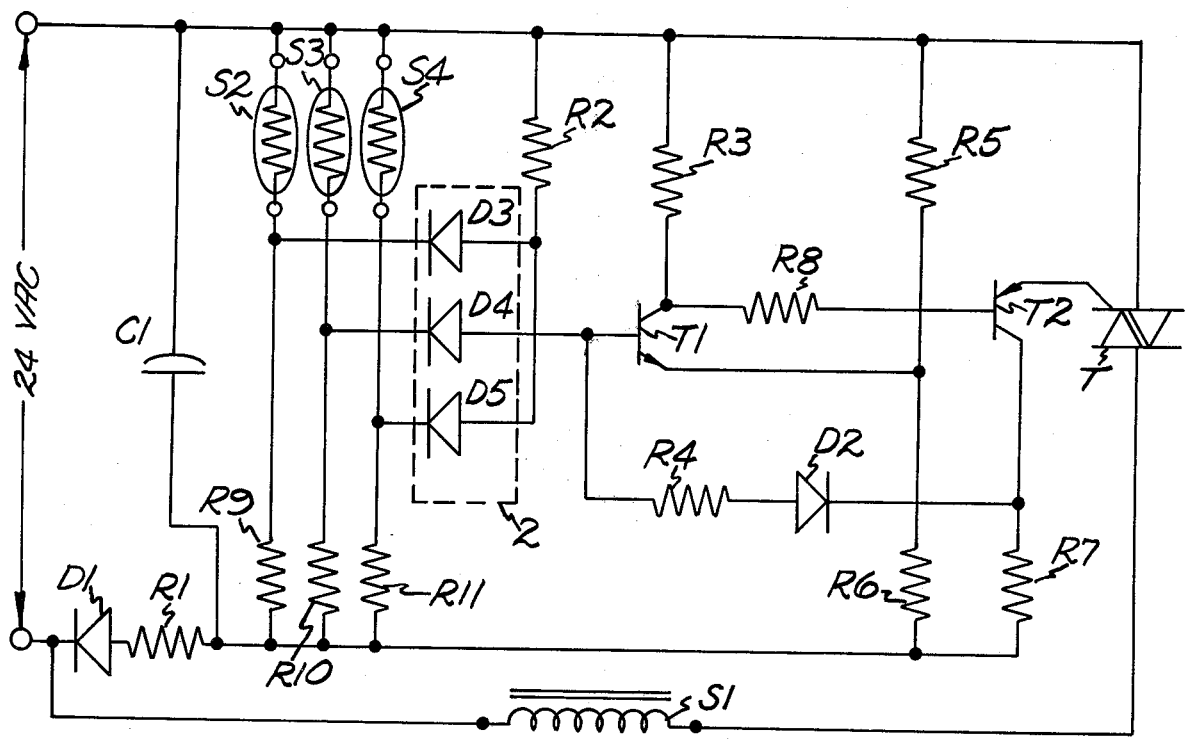

The above objects and still further objects of the invention will become apparent to those skilled in the art after consideration of the following preferred embodiments thereof, which are provided by way of example and not by way of limitation, wherein:

FIG. 1 is a circuit diagram of a protection circuit in accordance with a first embodiment of the present invention; and FIG. 2 is a circuit diagram of a protection circuit in accordance with a second embodiment of the present invention.

Referring first to FIG. 1, there is shown a protection circuit including a PTC sensor S which forms a voltage divider with a resistor R2. During normal operation of the protective device, the sensor S will be in a low resistance mode as will be explained hereinbelow. In this situation, the transistor T1 will be conducting and therefore the transistor T2 will also be conducting. When transistors T1 and T2 are conducting in substantially full on state, the gate of the triac T is operated to allow current conduction through the triac to the contactor S1. The remainder of the bridge circuit which causes or allows conduction of the transistors T1 and T2 during normal operating conditions are the resistors R5 and R6 in conjunction with the sensor S and the resistor R2. Transistors T1 and T2 are connected in a modified Schmitt trigger arrangement so that when transistor T1 is conducting, transistor T2 is also conducting and when transistor T1 is non-conducting, transistor T2 is also non-conducting. Transistors T1 and T2 operate in the full off or substantially full on state.

When an alarm condition is sensed by the sensor S and the bridge is unbalanced, this alarm threshold being determined by the values of resistors R5 and R6, the transistors T1 and T2 will turn off, thereby removing the gate signal to the triac T and turning off the triac.

When the transistors T1 and T2 are conducting, the diode D2 is back biased and no current will be flowing through resistor R4 and diode D2. Therefore these components do not influence the circuit at this time. When the transistors T1 and T2 are off, the diode D2 is then forward biased and resistors R4 and R7, connected in series, are now in parallel with resistor R2. This means that the resistance of the voltage divider between point A and point D is now lower and gives a lower threshold value. Therefore, the sensor S now has to drop to a lower resistance value to rebalance the bridge. This provides a differential between alarm condition and reset condition of the circuit.

Referring now to resistor R8, this resistor is provided primarily to prevent burn-out of transistors T1 and T2 due to placement of high voltage a.c. across the leads A and C by accident. The capacitor C2 is utilized to eliminate spikes or transients which may occur during operation and cause a false alarm. The component C1, D1 and R1 are merely the filtering portion of the power supply. This is required because of the change from a.c. to d.c. in operation of the circuit.

The circuit includes short circuit protection of the sensor leads. If there is a short circuit across the points C and A, both of the transistors T1 and T2 will turn off because the base voltage and the collector voltage of transistor T1 will be the same. In the case of an open sensor lead, the transistors T1 and T2 will be off because an infinite resistance will be sensed across the points C and A.

In the event a plurality of devices are to be protected such as, for example, three motors, the sensor S of FIG. 1 would be modified to include three such sensors connected in series. The three sensors would not have to be identical and the system would still operate as above described due to the peculiar temperature versus resistance characteristics of the PTC devices utilized herein as will be explained hereinbelow.

Referring now to FIG. 2, there is shown a second embodiment in accordance with the present invention. In accordance with this embodiment, the entire circuit is identical to that of FIG. 1 with the exception that the sensor S of FIG. 1, when in the three sensor embodiment as described in the above paragraph, can be replaced by three sensors in parallel which are labelled S2, S3 and S4. These sensors will be of the PTC variety, the same as discussed with regard to FIG. 1. When the three sensors S2 through S4 are utilized in parallel, it is necessary to supply a gate 2 which operates as an OR gate to operate the protection circuit in the event any one of the sensors detect an alarm condition. This gate is provided by means of the diodes D3, D4 and D5. Therefore, in the event any one of the sensors S2, S3 or S4 displays a resistance value above a predetermined threshold as previously explained, a signal will be provided through gate 2 to operate the protection circuit.

However upon reset gate 2 operates as an AND gate connected to the sensors S2, S3 and S4.

Referring now to the PTC sensor elements, these are well known materials, also known as steep slope PTC or positive temperature coefficient type devices though shallow sloped PTC devices can also be used. These materials have a relatively constant resistance for increase in temperature until a particular threshold temperature is reached whereupon at the anomaly temperature, the temperature coefficient of the material increases dramatically. The PTC sensors are usually formed from doped barium titanate, the anomalous behavior being caused by a change in the crystal structure of the doped barium titanate ceramic. The characteristic anomaly temperature and resultant temperature coefficient are determined by the chemical composition of the barium titanate. Resistance changes of the PTC devices in the steep slope region after the anomaly temperature has been reached fall in the range of 25 to 150% per degree centigrade.

It can be seen that there has been provided a protection circuit utilizing relatively inexpensive and simple circuitry which provides a very accurate protection with substantial differential between the alarm condition and reset as determined by the circuit parameters.

Though the invention has been described with respect to specific preferred embodiments thereof, many variations and modifications thereof will immediately be held apparent to those skilled in the art. It is therefore the intention that the appended claims be interpreted as broadly as possible in view of the prior art to include all such variations and modifications.

What is claimed is:

1. A protection circuit for a device to be protected, which comprises:
   a. a switch and a source of power,
   b. a bridge circuit means controlling operation of said switch said bridge circuit including a resistor bridge,
   c. said bridge circuit means including a PTC temperature sensor means responsive to a predetermined alarm condition,
   d. means responsive to said predetermined alarm condition for providing a reset condition different from both said alarm condition and the normal operating condition, said means responsive to said predetermined alarm condition includes resistance means coupled in parallel with another of the legs of said bridge whereby said sensor and the parallel combination of said another of the legs with said resistance means forms a voltage divider,
   e. and trigger means responsive to unbalance of said bridge to operate said switch.

2. A protection circuit as set forth in claim 1 wherein said trigger means is controlled by the voltage at the junction of said sensor and said parallel combination.

3. A protection circuit as set forth in claim 2 wherein said sensor includes a plurality of PTC devices connected in series.

4. A protection circuit as set forth in claim 2 wherein said sensor includes a plurality of PTC devices connected in parallel and an OR gate coupled to said PTC devices.

5. A protection circuit as set forth in claim 1 wherein said sensor includes a plurality of PTC devices connected in series.

6. A protection circuit as set forth in claim 1 wherein said sensor includes a plurality of PTC devices connected in parallel and an OR gate coupled to said PTC devices.

7. A protection circuit for a device to be protected as set forth in claim 1 wherein said means responsive to said predetermined alarm condition for providing a reset condition different from both said alarm condition and the normal operating condition includes a normally reverse biased diode.

8. A protection circuit for a device to be protected as set forth in claim 1 wherein said switch is a triac having two anodes in series with said source of power and a gate serially connected to said means responsive to said predetermined alarm condition, said means responsive to said predetermined alarm condition comprises a modified Schmitt trigger having a PNP transistor, said gate being serially connected to the emitter of said transistor.

* * * * *